United States Patent
Shamasundar

(10) Patent No.: US 11,377,231 B2
(45) Date of Patent: Jul. 5, 2022

(54) AUTOMATICALLY ADJUSTABLE LANDING LIGHTS FOR AIRCRAFT

(71) Applicant: HONEYWELL INTERNATIONAL INC., Morris Plains, NJ (US)

(72) Inventor: Raghu Shamasundar, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 547 days.

(21) Appl. No.: 16/268,707

(22) Filed: Feb. 6, 2019

(65) Prior Publication Data

US 2020/0247556 A1     Aug. 6, 2020

(51) Int. Cl.
  *B64D 47/04*    (2006.01)
  *B64D 43/00*    (2006.01)
  *B64D 45/08*    (2006.01)

(52) U.S. Cl.
  CPC ............ *B64D 47/04* (2013.01); *B64D 43/00* (2013.01); *B64D 45/08* (2013.01)

(58) Field of Classification Search
  CPC ......... B64D 47/04; B64D 43/00; B64D 45/08
  See application file for complete search history.

(56) References Cited

U.S. PATENT DOCUMENTS

| | | | | |
|---|---|---|---|---|
| 2,017,692 A | * | 10/1935 | Gaty ..................... | B64D 47/04 244/1 R |
| 2,612,331 A | * | 9/1952 | Frazier ................ | G05D 1/0653 244/188 |
| 2,787,428 A | * | 4/1957 | Schuck ..................... | G01S 1/02 244/183 |
| 2,916,736 A | * | 12/1959 | Van ........................ | G01S 7/4021 342/169 |
| 2,979,832 A | * | 4/1961 | Klemperer ............. | G09B 9/305 434/43 |
| 3,002,713 A | * | 10/1961 | Noxon ................. | G05D 1/0061 244/183 |

(Continued)

FOREIGN PATENT DOCUMENTS

| | | | | |
|---|---|---|---|---|
| CA | 3018601 A1 | * | 9/2017 | ................ B64F 3/02 |
| DE | 4225413 C1 | * | 3/1994 | .......... G01S 13/9011 |

(Continued)

*Primary Examiner* — Behrang Badii
*Assistant Examiner* — Jalal C Coduroglu
(74) *Attorney, Agent, or Firm* — Lorenz & Kopf, LLP

(57) ABSTRACT

An automatically adjustable landing light circuit and method for an aircraft approaching a target are provided. The circuit includes a memory having therein an auto adjustable landing light program, and a processor operationally coupled to a source of real-time navigation data, a source of intended approach information, a source of target geometry, and a source of environmental information including cross-wind data. The processor executes the auto adjustable landing light program, to: determine a course correction, as a function of the cross-wind data, upon determining each occurrence of deviations exceeding respective thresholds for the current heading and an intended heading, the current pitch and an intended pitch, and the current yaw and an intended yaw. The processor generates control motor commands for a landing lights assembly that generates a landing light projection. The control motor commands adjust the landing light projection in accordance with each determined course correction.

20 Claims, 4 Drawing Sheets

(56) References Cited

U.S. PATENT DOCUMENTS

| | | | | |
|---|---|---|---|---|
| 3,521,227 A | * | 7/1970 | Izumi | G01S 1/02 340/973 |
| 3,643,258 A | * | 2/1972 | Balding | G01S 1/02 342/413 |
| 3,688,885 A | * | 9/1972 | Cummings | F16D 21/02 192/95 |
| 3,742,221 A | * | 6/1973 | Horner | H05B 39/042 250/2 UAL |
| 3,792,309 A | * | 2/1974 | McDonald | H05B 41/34 315/200 A |
| 3,939,571 A | * | 2/1976 | Studdard | B64F 1/18 33/375 |
| 4,920,469 A | * | 4/1990 | Harding | F21S 41/365 362/300 |
| 5,072,346 A | * | 12/1991 | Harding | F21S 41/365 362/187 |
| 5,355,131 A | * | 10/1994 | Metz | B64D 47/04 340/981 |
| 5,363,475 A | * | 11/1994 | Baker | G06T 1/60 345/422 |
| 6,243,649 B1 | * | 6/2001 | Wetherbee | G01C 21/005 33/356 |
| 7,080,928 B2 | * | 7/2006 | Barnhart | B64D 47/04 315/82 |
| 7,617,022 B1 | * | 11/2009 | Wood | G02B 27/01 340/447 |
| 7,965,223 B1 | * | 6/2011 | McCusker | G08G 5/0078 342/29 |
| 8,439,534 B1 | * | 5/2013 | Roe | F21V 29/15 362/486 |
| 9,643,736 B1 | * | 5/2017 | Ell | B64D 47/08 |
| 9,723,677 B2 | | 8/2017 | Hessling-Von Heimendahl et al. | |
| 9,944,405 B2 | | 4/2018 | Mouton et al. | |
| 10,054,939 B1 | * | 8/2018 | Applewhite | B64C 39/024 |
| 10,189,579 B2 | * | 1/2019 | Hessling-Von Heimendahl | F21S 41/663 |
| 2003/0107898 A1 | | 6/2003 | Smith et al. | |
| 2003/0107899 A1 | * | 6/2003 | Barnhart | B64D 47/04 362/472 |
| 2004/0105264 A1 | * | 6/2004 | Spero | F21V 23/0471 362/276 |
| 2005/0122728 A1 | * | 6/2005 | Reinert | B64F 1/20 362/470 |
| 2006/0167596 A1 | * | 7/2006 | Bodin | G05D 1/0027 701/3 |
| 2006/0187087 A1 | * | 8/2006 | Greene | H05B 47/20 340/951 |
| 2009/0152391 A1 | * | 6/2009 | McWhirk | B64B 1/02 244/30 |
| 2010/0179712 A1 | * | 7/2010 | Pepitone | G07C 5/0808 701/14 |
| 2010/0204055 A1 | * | 8/2010 | Bonner-Ferraby | G01N 33/564 506/9 |
| 2012/0206050 A1 | * | 8/2012 | Spero | F21V 19/02 315/152 |
| 2013/0094210 A1 | * | 4/2013 | Rice | F21S 41/143 362/245 |
| 2013/0155706 A1 | * | 6/2013 | Jha | B64D 47/06 362/470 |
| 2013/0336010 A1 | * | 12/2013 | Saxena | H02M 7/217 363/13 |
| 2014/0343765 A1 | * | 11/2014 | Suiter | G08G 5/0021 701/18 |
| 2015/0002316 A1 | * | 1/2015 | Sridhar | G08G 5/0013 340/953 |
| 2016/0076722 A1 | * | 3/2016 | Hessling Von Heimendahl | B64D 47/04 362/470 |
| 2016/0280393 A1 | * | 9/2016 | Mouton | B64D 47/04 |
| 2016/0307450 A1 | * | 10/2016 | Songa | G08G 5/0021 |
| 2016/0345401 A1 | * | 11/2016 | Hessling-Von Heimendahl | B64D 47/04 |
| 2017/0073083 A1 | * | 3/2017 | Hessling-Von Heimendahl | B64D 47/04 |
| 2017/0151027 A1 | * | 6/2017 | Walker | A61B 34/30 |
| 2017/0203855 A1 | * | 7/2017 | Leclear | H05B 47/105 |
| 2017/0229022 A1 | * | 8/2017 | Gurel | H04B 7/18506 |
| 2017/0313408 A1 | * | 11/2017 | Sheffer | B64D 43/02 |
| 2018/0025473 A1 | * | 1/2018 | Contreras | G08G 5/006 348/144 |
| 2018/0025649 A1 | * | 1/2018 | Contreras | G05D 1/0274 701/3 |
| 2018/0170577 A1 | * | 6/2018 | Hessling-Von Heimendahl | F21S 41/141 |
| 2019/0096270 A1 | * | 3/2019 | Wang | G08G 5/025 |
| 2020/0247556 A1 | * | 8/2020 | Shamasundar | B64D 47/04 |

FOREIGN PATENT DOCUMENTS

| | | | |
|---|---|---|---|
| DE | 19930096 A1 * | 5/2000 | B64F 1/20 |
| EP | 3072818 A1 * | 9/2016 | B64C 37/02 |
| EP | 3082121 A1 * | 10/2016 | G01C 21/20 |
| EP | 3269596 B1 * | 7/2019 | B60Q 1/245 |
| EP | 3688885 A1 * | 8/2020 | G05D 1/0022 |
| WO | WO-9415833 A1 * | 7/1994 | B64F 1/20 |
| WO | WO-2017139282 A1 * | 8/2017 | B64C 39/024 |
| WO | WO-2017165854 A2 * | 9/2017 | B64F 3/02 |
| WO | WO-2017197524 A1 * | 11/2017 | G01M 9/065 |
| WO | WO-2018015684 A2 * | 1/2018 | B64C 39/022 |
| WO | WO-2019067788 A1 * | 4/2019 | G05D 1/0866 |

* cited by examiner

AUTOMATICALLY ADJUSTABLE LANDING LIGHTS FOR AIRCRAFT

TECHNICAL FIELD

The technical field generally relates to landing light systems for aircraft, and more particularly relates to landing light circuits and methods for aircraft that automatically adjust (auto adjustable) as a function of environmental factors and aircraft navigational data.

BACKGROUND

Landing light systems, having therein at least one landing light, are mounted on aircraft and are primarily activated to illuminate the terrain and runway ahead during takeoff and landing. As may be appreciated, landing lights are primarily useful during the night, to enhance the crew visibility on the forward view. The crew relies on appropriate functionality of the landing light system to make time critical decisions during normal or low visibility conditions.

Available landing light systems generally provide the following functionality for an aircraft. First, landing light systems generally activate, or illuminate terrain, only in response to manual interaction (e.g., manipulation of an on/off switch) by the crew. In addition, landing light systems are often limited to a static location of illumination and a static area of illumination on an aerodrome.

Airport environmental conditions can change drastically. In some instances, a strong ground wind or crosswind can occur at the aerodrome, at any angle, with respect to an aircraft's ground track. In some instances, the temperature varies across and above the aerodrome, which influences the crosswinds. Further, the direction and force of a crosswind may vary markedly, even multiple times, within a few hundred feet of the ground. As a result, in practice, the airport environmental conditions can adversely affect the operation and performance of the aircraft at the aerodrome. For example, during the final approach phase, ground wind and temperature can affect aircraft flight plan data, such as the aircraft orientation/heading, causing a misalignment between the aircraft nose and the runway heading. These and other problems illustrate technological limitations associated with available landing light systems. These technological limitations often require the crew to make frequent visual checks of the actual ground track of the aircraft, and to make manual wind corrections as necessary.

Accordingly, a technologically enhanced landing light circuit that can adjust as a function of the environmental conditions and aircraft state is desirable. It is further desired that the technologically enhanced landing light circuit perform these adjustments automatically, i.e., promptly, and without manual interaction. The following disclosure provides these technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An automatically adjustable landing light circuit for an aircraft is provided, including: a source of real-time navigation data including current altitude, current heading, current pitch and current yaw; a source of intended approach information, including a target, an intended pitch and intended yaw; a source of target geometry including a centerline; a source of environmental information including cross-wind data; a landing lights assembly configured to project a landing light projection along a beam axis, and a control motor configured to control the beam axis responsive to control motor commands; a memory comprising an auto adjustable landing light program; and a processor operationally coupled to the source of real-time navigation data, the source of intended approach information, the source of target geometry, the source of environmental information, and the memory, the processor, when programmed with the auto adjustable landing light program, performs the operations of: determining a respective course correction, as a function of the cross-wind data, upon determining each occurrence of (i) a deviation between the current heading and the centerline exceeds a heading threshold, (ii) a deviation between the current pitch and the intended pitch exceeds a pitch threshold, and (iii) a deviation between the current yaw and the intended yaw exceeds a yaw threshold; and generating control motor commands for the control motor to adjust the landing light projection in accordance with the respective course correction, for each respective course correction.

Another embodiment of an automatically adjustable landing light circuit for an aircraft approaching a target is provided. The circuit includes: a source of real-time navigation data including current altitude and current heading; a source of target geometry including a centerline; a source of cross-wind data; a landing lights assembly configured to project a landing light projection along a beam axis, and a control motor configured to control the beam axis responsive to control motor commands; a memory comprising an auto adjustable landing light program; and a processor operationally coupled to the source of real-time navigation data, the source of intended approach information, the source of target geometry, the source of environmental information, and the memory, the processor, when executing the auto adjustable landing light program, performs the operations of: determining a course correction, as a function of the cross-wind data, upon determining each occurrence of a deviation between the current heading and the centerline exceeding a heading threshold; and generating control motor commands for the control motor to adjust the landing light projection in accordance with the course correction.

Also provided is a method for automatically adjustable landing lights for an aircraft, comprising: by a processor programmed with an auto adjustable landing light program, receiving, from a navigation system, real-time aircraft navigation data including a current altitude and current heading; receiving a target and centerline; receiving cross-wind data associated with the target; referencing an intended heading; determining a course correction, as a function of the cross-wind data, upon determining each occurrence of a deviation between the current heading and the centerline exceeding a heading threshold; and generating control motor commands in accordance with the course correction; and at a landing lights assembly comprising a landing light and a control motor, receiving the control motor commands; and adjusting a landing light projection in accordance with the course correction.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, dynamic airport environmental conditions can evince the technological limitations of available landing light systems. Multiple variations of crosswind and temperature can occur across and above the aerodrome, even multiple times and within a few hundred feet of the ground. The herein described technologically improved auto adjustable landing light circuit (FIG. 1, 102) can automatically adjust the landing light projection (i.e., the location of illumination and the area of illumination) as a function of the environmental conditions and aircraft navigation data (i.e., aircraft state). The adjustments are done automatically, i.e., promptly, and without contemporaneous manual interaction. These technological improvements free up the crew from the cognitive demand of making frequent visual checks of the actual ground track of the aircraft, and manually correcting for the wind and environmental conditions.

The proposed circuit and method provide the following advantages to landing light and search and rescue light systems:

1. Determine a course correction with respect to a runway heading, environmental conditions, and aircraft state.
2. Automatically maximize the runway visibility by feeding the course correction to landing light control motors and re-adjusting the landing light projection accordingly.
3. Provide maximum runway visibility during landing operations, accounting for environmental conditions.
4. Reduce the crew work load and increase the overall situational awareness in the cockpit.
5. Enhance the effectiveness of crew and ground handling communications.
6. Increase the functionality of a search light in a search and rescue system where by providing an auto adjust of the light projection of a search light based on the flight plan and aircraft state/navigational data.

Figure 1:
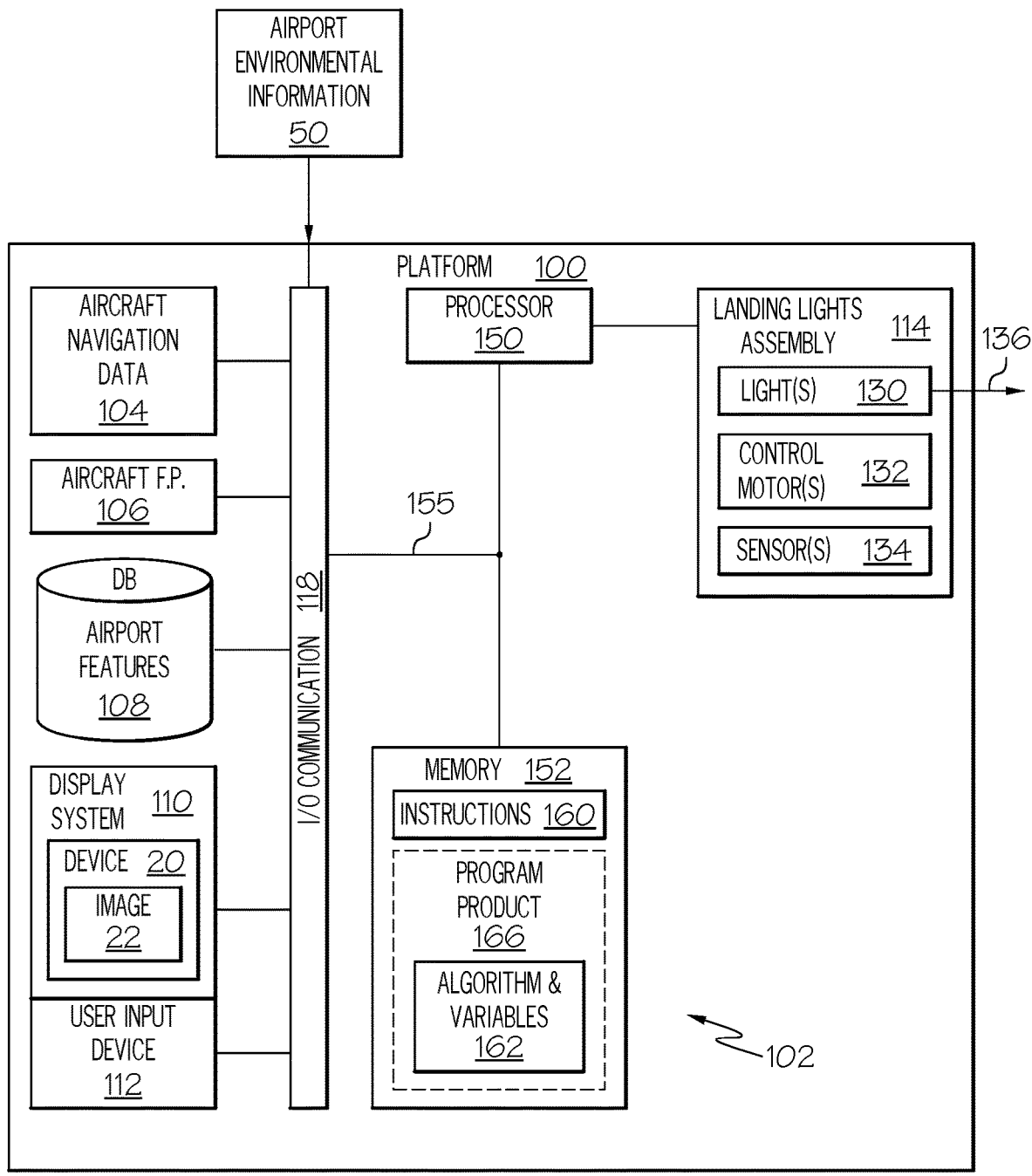
FIG. 1 is a block diagram of an auto adjustable landing light circuit, in accordance with an exemplary embodiment.

Turning now to FIG. 1, in an embodiment, the auto adjustable landing light circuit 102 (also referred to herein as "circuit" 102) is generally associated with a mobile platform 100. In various embodiments, the mobile platform 100 is an aircraft, and is referred to as aircraft 100. In some embodiments, the circuit 102 is integrated within a preexisting mobile platform management system, avionics system, cockpit display system (CDS), flight controls system (FCS), or aircraft flight management system (FMS). Although the circuit 102 is shown as onboard the aircraft 100, in other embodiments, it may exist in an electronic flight bag (EFB) or portable electronic device (PED), such as a tablet, cellular phone, or the like. In embodiments in which the control module is within an EFB or a PED, a display system 110 and a user input device 112 may also be part of the EFB or PED.

The circuit 102 may embody a processor 150 communicatively coupled to (such as via a bus 155), or integrated with, a memory 152. The memory 152 may have stored therein a novel auto adjustable landing light program. The processor 150/memory 152 combination may be in operable communication with, and receive input signals from, any combination of the following systems: a source of airport features data 108, such as a database; a source of navigation data 104, such as an inertial navigation system; a source of an intended flight plan 106, such as a navigation database; a source of external environmental information 50; and, a landing lights assembly 114. The processor 150 processes inputs and generates commands and controls for the landing lights assembly 114 based thereon (operation 516, FIG. 5). In various embodiments, communication between the onboard systems, the processor 150, and external systems, such as the source of environmental information 50, is via a communication system and fabric 118. In some embodiments, the processor 150 is also in operable communication with the user input device 112 and display system 110. The functions of these aircraft systems, and their interaction, are described in more detail below.

In some embodiments, the landing lights assembly 114 is shortened to lights assembly 114. Lights assembly 114 comprises at least one landing light (also referred to herein as "LL" 130). The LL 130 projects, along a beam axis and in accordance with its specifications, a beam of light referred to herein as the landing light projection 136 from a portion called a light head; the landing light projection 136 is a three-dimensional illumination volume surrounding the beam axis and illuminates a corresponding spot or area on which it impinges. In various embodiments, the lights assembly 114 also comprise one or more actuators, which in the depicted embodiment are control motors 132. The control motors 132 are configured, in response to control motor commands supplied from the processor 150, to control the orientation of the landing light projection 136 from one or more LL 130 (as used herein, controlling the orientation of the landing light projection 136 refers to controlling the beam axis with respect to earth) (operation 518, FIG. 5). By way of the processor 150 and the control motors 132, the landing light projection 136 is controlled to have the qualities of a location of illumination and a volume of illumination.

The lights assembly 114 may include sensors 134 to detect orientation and configuration status of the LL 130 and convert this LL 130 status data into electrical signals for processing by the processor 150. The relationship between the beam axis and the orientation and configuration of the LL 130 is known. As such, the processor 150 can convert LL 130 status data into current landing light projection 136 data, which it, in turn, utilizes to generate the control motor commands that are supplied to the control motors 132. The control motor commands direct the control motors to move the landing light projection toward a target geometry; in some embodiments, the target geometry is an airport feature, such as a runway, and in other embodiments, the target geometry is a moving object, such as a person, boat, or automobile. The control motors 132, in response to the control motor commands, adjust the beam axis to thereby achieve a desired landing light projection (i.e., implementing the course correction, thereby moving the landing light projection to center on the target geometry), and to confirm that the adjustment has been implemented. In practice, the steps of receiving the LL 130 status data, converting it, generating control motor commands, and confirming an adjustment, may be repeated continuously until the aircraft has completed a landing operation. In various embodiments, the processor 150 uses the LL status data to confirm that a course correction has been implemented. In various embodiments, the processor 150 can also convert LL 130 status data into a distance or range from the LL 130 to a desired spot or point of interest on a target geometry.

The source of environmental information 50 provides temperature, wind, and precipitation data. The magnitude and direction of cross-wind above and along the aircraft 100 travel path, referred to as cross-wind data, is particularly relevant. In various embodiments, the cross-wind data associated with the target is received and processed by the circuit 102 (operation 508, FIG. 5)

In some embodiments, the source of real-time aircraft navigation data 104 is an aircraft inertial navigation system. Real-time aircraft navigation data may include any of: a current location (e.g., the latitude, longitude, orientation), a current heading (i.e., the direction the aircraft is traveling in relative to some reference), a flight path angle, a vertical speed, a ground speed, a current altitude (or height above ground level), current pitch, current yaw, and a current phase of flight of the aircraft 100. As used herein, "real-time" is interchangeable with actual, current, and instantaneous. The aircraft inertial navigation system may be realized as including a satellite navigation system (GNSS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS, as will be appreciated in the art. The real-time aircraft navigation data is made available, generally by way of the communication system and fabric 118, so other components, such as the processor 150 and display system 110, may further process and/or handle the aircraft navigation data (operation 502, FIG. 5).

The source of an intended aircraft flight plan 106 may be a storage location, such as a navigation database. The intended aircraft flight plan includes intended approach information, which, in various embodiments, includes a target (for example, intended runway), and for various geospatial points, an intended heading, an intended pitch, and an intended yaw. In addition to maintaining flight plans, the source of an intended aircraft flight plan 106 may also maintain information regarding airports and/or other potential landing locations (or targets) for the aircraft 100. The source of airport features 108 may be a storage location, such as a database. The airport features include, for each target, target geometries, their locations, their orientations, and their centerlines. In various embodiments, a target is a runway, and the target geometry includes a runway threshold and centerline. In some embodiments, the source of airport features 108 is also a source of terrain data. The processor 150 receives intended data such as intended headings, pitch, and yaw, at operation 510, FIG. 5. The processor 150 receives or retrieves the target at operation 504, FIG. 5, and receives or retrieves the centerline for the target at operation 506, FIG. 5.

In various embodiments, the communications system and fabric 118 is configured as an input/output device, and to support instantaneous (i.e., real time or current) communications between on-board systems, the processor 150, and one or more external data source(s), such as the source of environmental information 50. The communications system and fabric 118 may incorporate one or more transmitters, receivers, and the supporting communications hardware and software required for components of the circuit 102 to communicate as described herein. In various embodiments, the communications system and fabric 118 may provide additional communications not directly relied upon herein, such as bidirectional pilot-to-ATC (air traffic control) communications via a datalink, and any other suitable radio communication system that supports communications between the aircraft 100 and various external source(s). The communications system and fabric 118 enables intra circuit 102 communication, as well as communications between the circuit 102 and the external data sources. The communications system and fabric 118 may include one or more network interfaces and can be implemented using any suitable method and circuit. In various embodiments, the communications system and fabric 118 is configured to support communication from an external system driver and/or another computer system. In one embodiment, the communications system and fabric 118 obtains data from external data source(s) such as the source of airport environmental information 50, directly. Also, in various embodiments, the communications system and fabric 118 may support communication with technicians, and/or one or more storage interfaces for direct connection to storage apparatuses, such as the database for the source of airport features 108.

In various embodiments, the user input device 112, display system 110, and the processor 150 are cooperatively configured to allow a user (e.g., a pilot, co-pilot, or crew member) to interact with one or more display devices 20 in the display system 110 and/or other elements of the circuit 102, via the communication system and fabric 118, as described herein. Depending on the embodiment, the user input device 112 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 112 is configured as a touchpad or touchscreen, it may be integrated with the display system 110. As used herein, the user input device 112 may be used by a pilot to communicate with external sources, to modify or upload the program product 166, to select a target, etc. In some embodiments, the processor 150, user input device 112, and display system 110 are configured as at least part of a control display unit (CDU).

In various embodiments, the processor 150, alone, or as part of a central management computer (CMS) or a flight management system (FMS), draws upon data and information from the source of aircraft inertial navigation 104, source of flight plan 106, source of airport features 108, and lights assembly 114 to provide real-time flight guidance for aircraft 100. The real-time flight guidance may be provided to a user by way of alphanumeric information, symbology, images, and alerts.

To interact with the user, the auto adjustable landing light circuit 102 may perform display processing, generate display commands for the display system 110 and thereby cause the display device 20 to render thereon images 22 including various graphical user interface elements, tables, icons, alerts, menus, buttons, and pictorial images, as required for interaction. The display system 110 may be configured to continuously receive and process the display commands from the circuit 102 and present information on the display device 20. In exemplary embodiments, the display device 20 is realized on one or more electronic display devices, such as a multi-function display (MFD) or a multi-function control display unit (MCDU), configured as any combination of: a head up display (HUD), an alphanumeric display, a vertical situation display (VSD) and a lateral navigation display (ND).

In various embodiments, the source of aircraft inertial navigation data 104 includes, or is integrated with, the source(s) of airport feature data 108 and terrain data, which have therein topographical information for an airport and surrounding environment. Therefore, the source of airport feature data 108 may include one or more of: a runway awareness and advisory system (RAAS) database and an Aerodrome Mapping Database (AMDB). In various embodiments, the databases have therein maps and geometries, including runway records with corresponding runway threshold locations. The AMDB may also include airport status data for the runways and/or taxi paths at the airport; the airport status data providing an operational status and directional information for the taxi paths (or portions thereof).

In various embodiments, the circuit 102 may be any processing logic and/or processor device having one or more cores individually or in any combination, as well as any hardware, software, firmware, and/or electronic control component. Depending on the embodiment, the circuit 102 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, the embodiment of the circuit 102 depicted in FIG. 1 comprises a processor 150 in communication with, or integrated with, a memory 152. The processor 150 facilitates communications and/or interaction between the elements of the circuit 102. The memory 152 stores instructions and applications 160 which direct the general operation of the circuit 102. The memory 152 specifically stores an auto adjustable landing light program and variables (simplified to program 162) that comprises one or more programs, algorithms and rules embodied as instructions and applications that, when executed by the processor 150, cause the processor 150 to perform the tasks, method steps and operations attributed to the circuit 102. During operation, the processor 150 loads and executes the program 162. When the processor 150 executes the program 162, the processor 150 performs the tasks, method steps and operations attributed to the circuit 102, as described herein.

As may be appreciated, the processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. The memory 152 stores instructions and applications 160 and program 162. Information stored in the memory 152 may be organized and/or imported from an external source during an initialization step of a process; it may also be programmed via a user input device 112.

Novel program 162 may be stored in a functional form on computer readable media, for example, as depicted, in memory 152. Those skilled in the art will recognize that the mechanisms of the present disclosure are capable of being distributed as a program product 166. As a program product 166, one or more types of non-transitory computer-readable signal bearing media may be used to store and distribute the program 162, such as a non-transitory computer readable medium bearing the program 162 and containing therein additional computer instructions for causing a computer processor (such as the processor 150) to load and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized as memory 152 and as program product time-based viewing of clearance requests in certain embodiments.

The data bus 155 serves to transmit programs, data, status and other information or signals between the various components of the circuit 102 (via the communication system and fabric 118), the processor 150, and the memory 152. The data bus 155 can be any suitable physical or logical means of connecting computer systems and components. This includes, but is not limited to, direct hard-wired connections, fiber optics, infrared and wireless bus technologies.

Figure 3:
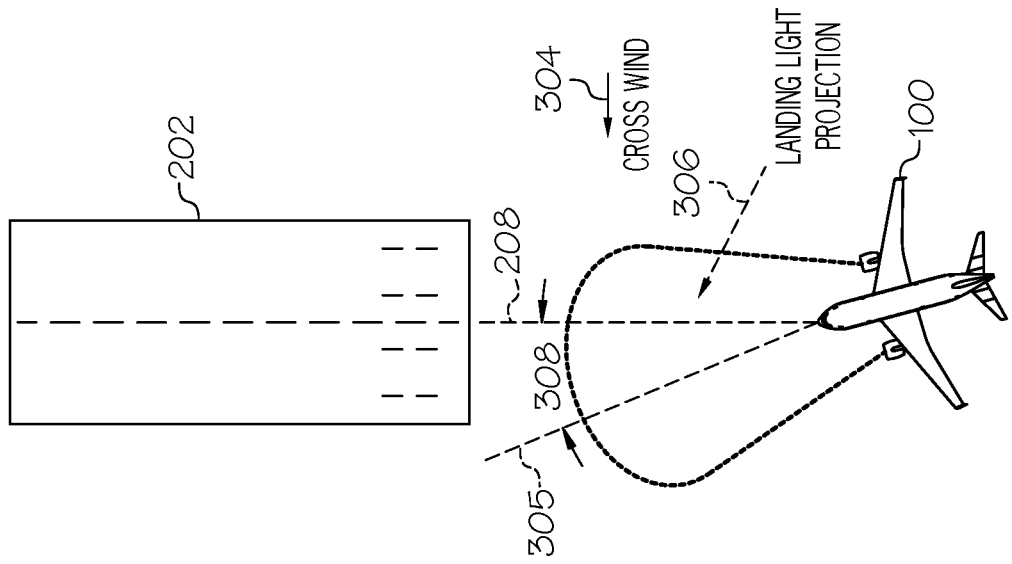
FIGS. 2-3 are illustrations depicting the functionality of prior art landing light systems.
Figure 2:
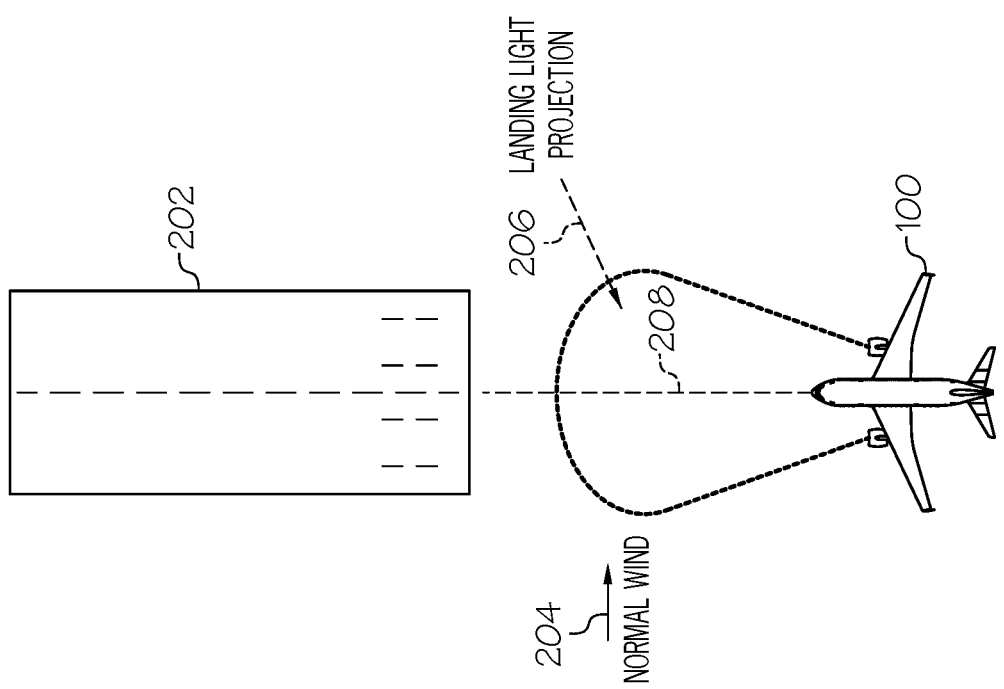

In FIGS. 2 and 3, illustrations depict available landing light systems that are not responsive to environmental conditions. FIG. 2 shows a normal cross-wind 204 (shown oriented perpendicular to the centerline 208, although other orientations also apply). A landing light projection 206, is evenly distributed around the actual aircraft heading, which is aligned with the centerline 208. Since the actual aircraft heading is where it should be, the landing light system is positioned such that the landing light projection 206 will illuminate the runway 202 as required. FIG. 3 shows what happens when a more severe cross-wind 304 occurs, and the actual aircraft heading is affected by it; the actual aircraft heading 305 (or ground track 305) has drifted from the centerline 208 by an angle 308. Landing light projection 306 is again evenly distributed around the actual aircraft heading. Since the actual aircraft heading 305 is not where it should be, the landing light projection 306 will not illuminate the runway 202 as required. In the scenario of FIG. 3, a visual check and timely manual course correction is required by the crew to restore the aircraft heading to align it with the centerline 208.

Figure 4:
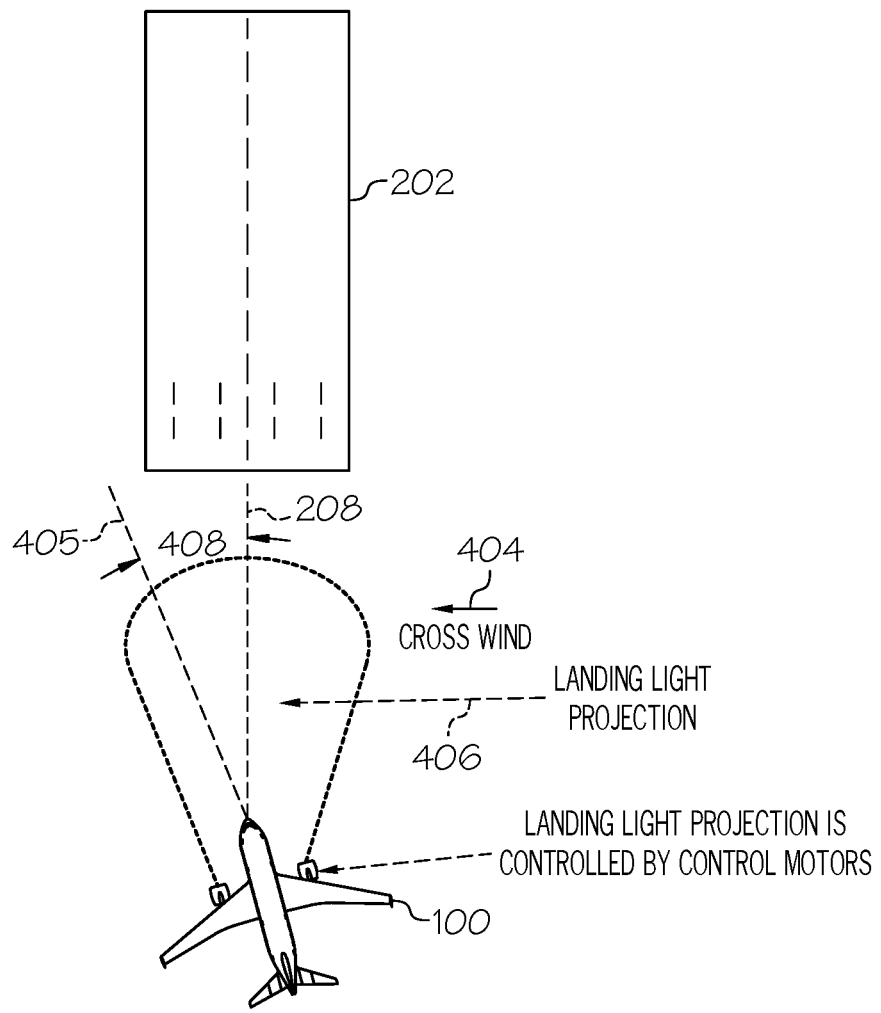
FIG. 4 is an illustration depicting a use case for an auto adjustable landing light circuit and method, in accordance with an exemplary embodiment.
Figure 5:
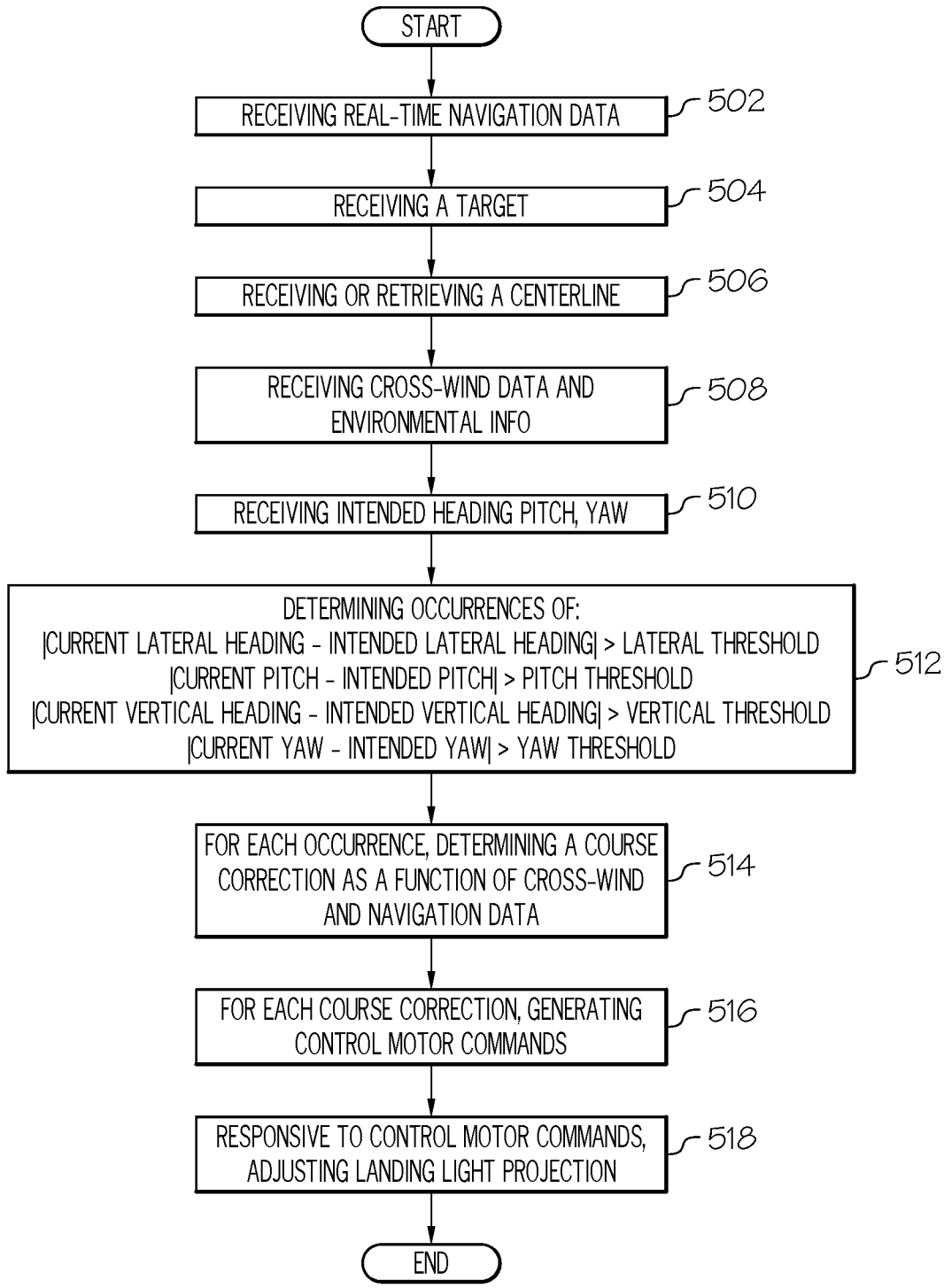
FIG. 5 is a flowchart for a method for auto adjustable landing lights, in accordance with an embodiment.

In FIG. 4, and with reference to FIG. 5, a use case for the technologically improved auto adjustable landing light circuit 102 is described. In various embodiments, the program 162 monitors the current altitude, and only when the aircraft is below a threshold altitude, it performs the herein described tasks. In other embodiments, the program 162 performs the herein described tasks continuously. The processor 150 receives or retrieves the target geometry (runway 202) and centerline 208 at operations 504 and 506. The source of environmental information detects a severe cross-wind 404 communicates this to the processor 150 at operation 508. The actual aircraft heading 405 is affected by cross-wind 404; The auto adjustable landing light circuit 102 determines that the actual aircraft heading 405 has deviated from the centerline 208 by an angle 408 (operation 512) and compares the deviation to a preprogrammed heading threshold. Threshold units are appropriate such that the deviation can be represented by the absolute value of the difference. Upon determining an occurrence of the deviation exceeding the preprogrammed heading threshold, the circuit 102 determines, as a function of the cross-wind data, an associated course correction to restore the actual aircraft heading 405 to the required aircraft heading, centerline 208 (operation 514) and generates control motor commands (operation 516) to command the control motors 132 to redirect the projection 406 in accordance with the associated course correction. Redirecting the projection 406 in accordance with the course correction assures not only that the projection will illuminate the runway 202 as required, but additionally, that the projection will illuminate the travel path of the aircraft 100 during the course correction. As described above, the determined course correction data is automatically, and without delay, fed to the landing light control motors 132 to automatically, and without delay, adjust the landing light projection 406 to align with the target (i.e., runway 202) centerline 208 (operation 518). In performing these tasks, the circuit 102 maximizes a forward field of view toward the target, and increases overall situational awareness and cockpit safety, especially during the low visibility conditions.

In the simple illustrations provided, the landing light projections (206, 306, 406) are described in two dimensions, the illustrated deviations are lateral, and the heading threshold is a lateral heading threshold used to achieve a lateral axis course correction. However, in practice, each LL 130 projects a three-dimensional volume having a somewhat conical shape. In various embodiments, the circuit 102 performs the lateral axis course correction and a similar set of tasks to determine a vertical axis course correction (i.e., the auto adjustable landing light circuit 102 detects the vertical deviation between a vertical component of the actual aircraft heading 405 and a vertical component of the required aircraft heading and compares the vertical deviation to a preprogrammed vertical heading threshold). At operation 512, upon determining an occurrence of the vertical deviation exceeding the preprogrammed vertical heading threshold, the circuit 102 determines, as a function of the cross-wind data, an associated course correction to restore the actual aircraft heading 405 to the required aircraft heading and commands the control motors 132 to redirect the projection 406 in accordance with the vertical axis course correction (operation 514).

As mentioned, current navigational information is continually received and the circuit 102 may perform additional tasks based thereon. For example, in various embodiments, the circuit 102 performs the lateral axis course correction, a vertical axis course correction, and (also at operation 512) compares the actual yaw to an intended yaw and yaw threshold to generate, as a function of the cross-wind data, a yaw course correction (also at 514). In various embodiments, the circuit 102 performs the lateral axis course correction, a vertical axis course correction, and compares the actual pitch to an intended pitch and pitch threshold (also at operation 512) to generate, as a function of the cross-wind data, a pitch course correction (also at 514). In any of the above described embodiments, at 514, the determined respective course correction may be converted into display commands for the display system 110 to render one or more images 22 for the pilot and crew to view.

As mentioned, the concepts developed herein may be applied to search lights in an emergency rescue system. In these embodiments, the course correction and commands for the control motors 132 to redirect the projection 406 are determined the same way and applied to control motors for the search light.

Thus, an automatically adjustable landing light circuit 102 and method for an aircraft 100 approaching a target 202 are provided. The circuit 102 includes a memory having therein an auto adjustable landing light program, and a processor 150 operationally coupled to a source of real-time navigation data, a source of intended approach information, a source of target geometry, and a source of environmental information. The processor 150 executes the auto adjustable landing light program 162, and may, in various embodiments: determine a course correction, as a function of cross-wind data, upon determining each occurrence of a deviation between the current heading an intended heading exceeding a heading threshold, each occurrence of a pitch threshold being exceeded and each occurrence of a yay threshold being exceeded. The processor 150 generates control motor commands for a landing lights assembly that generates a landing light projection. The control motor commands adjust the landing light projection in accordance with each determined course correction.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or." Accordingly, A or B is true for the three cases: A is true, B is true, and, A and B are true. In some cases, the exclusive "or" is constructed with "and;" for example, "one of A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An automatically adjustable landing light circuit for an aircraft, comprising:
    an inertial navigation system configured to provide real-time navigation data including current altitude, actual aircraft heading, current pitch and current yaw;
    a navigation database configured to provide an intended approach to a target, including, for various geospatial points along a travel path to the target, an intended heading;
    an external source of environmental information that includes a magnitude and a direction of a cross-wind above and along the travel path, referred to as cross-wind data;
    a landing lights assembly including a landing light (LL) and a control motor;
    the landing lights assembly configured to project a landing light projection along a beam axis; the control motor configured to control the orientation and configuration of the beam axis and the landing light projection, responsive to control motor commands;
    a memory comprising an auto adjustable landing light program; and
    a processor operationally coupled to the source of real-time navigation data, the source of intended approach information, the source of environmental information, and the memory, the processor, when programmed with the auto adjustable landing light program, performs the operations of:
    generating the control motor commands;
    causing the landing lights assembly to project the landing light projection;
    determining that the actual aircraft heading has deviated from a centerline of the target by an angle, as a function of the cross-wind data, and a course correction required responsive thereto, to align the actual aircraft heading with the centerline of the target; and
    adjusting the beam axis responsive to the course correction.

2. The circuit of claim 1, wherein the processor performs the step of determining the course correction only when the aircraft is below a threshold altitude.

3. The circuit of claim 2, wherein the processor performs the step of determining the course correction based on determining each occurrence of (i) a deviation between the current heading and the centerline exceeds a heading threshold, (ii) a deviation between the current pitch and the intended pitch exceeds a pitch threshold, and (iii) a deviation between the current yaw and the intended yaw exceeds a yaw threshold; and
the target is a runway.

4. The circuit of claim 2, wherein the real-time navigation data further includes a current phase of flight, and wherein the processor performs the step of determining the course correction only when the aircraft is in a final approach phase.

5. The circuit of claim 3, wherein the processor is further configured to, for each course correction, convert the course correction into respective display commands for the display system to render one or more images.

6. The circuit of claim 2, wherein the processor is further configured to continuously repeat the steps of determining a course correction and generating respective control motor commands until the aircraft has completed a landing operation.

7. An automatically adjustable landing light circuit for an aircraft approaching a target, comprising:

an inertial navigation system configured to provide real-time navigation data including current altitude and an actual aircraft heading;
a navigation database configured to provide an intended approach to a target, including, for various geospatial points along a travel path to the target, an intended heading;
a source of cross-wind data that includes a magnitude and a direction of a cross-wind above and along the travel path;
a landing lights assembly configured to project a landing light projection along a beam axis, and a control motor configured to control an orientation and configuration of the beam axis and the landing light projection, responsive to control motor commands;
a memory comprising an auto adjustable landing light program; and
a processor operationally coupled to the inertial navigation system, the navigation database, the source of environmental information, and the memory, the processor, when executing the auto adjustable landing light program, performs the operations of:
generating the control motor commands;
causing the landing lights assembly to project the landing light projection;
receiving the cross-wind data;
determining a course correction required, as a function of the cross-wind data, upon each occurrence of the actual aircraft heading deviating from a centerline of the target by an angle that exceeds a heading threshold; and
adjusting the beam axis to move the landing light projection to center on the centerline of the target, responsive to the course correction.

8. The circuit of claim 7, wherein the course correction is a lateral axis course correction, and the processor is further configured to determine a vertical axis course correction as a function of the cross-wind data, upon each occurrence of a deviation between the actual aircraft heading and a required vertical heading exceeding a vertical heading threshold.

9. The circuit of claim 8, wherein the processor performs the step of determining the respective course corrections only when the aircraft is below a threshold altitude.

10. The circuit of claim 8, wherein the real-time navigation data further includes a current phase of flight, and wherein the processor performs the step of determining the respective course correction only when the aircraft is in a final approach phase.

11. The circuit of claim 9, wherein the target is a runway and a source of target is a runway database.

12. The circuit of claim 11, wherein the processor is further configured to, for each course correction, convert the course correction into display commands for the display system to render one or more images.

13. The circuit of claim 12, wherein the processor is further configured to continuously repeat the steps of determining a respective course correction and generating control motor commands until the aircraft has completed a landing operation.

14. The circuit of claim 13, wherein the landing lights assembly comprises a landing light and a sensor configured to detect the orientation and the configuration of the landing light, referred to as LL status data.

15. The circuit of claim 14, wherein the processor is further configured to use the LL status data to, for each course correction, confirm that the course correction has been implemented.

16. The circuit of claim 9, wherein the target is a moving object and a source of target is a user input device operationally coupled to the processor.

17. A method for automatically adjustable landing lights for an aircraft, comprising:
by a processor programmed with an auto adjustable landing light program,
receiving, from a navigation system, real-time aircraft navigation data including a current altitude and an actual aircraft-heading;
receiving a target and centerline of the target;
receiving cross-wind data that includes a magnitude and a direction of a cross-wind above and along a travel path to the target;
referencing an intended heading provided by a navigation database;
generating control motor commands causing the automatically adjustable landing lights to project a landing light projection along a beam axis;
determining that the actual aircraft heading has deviated from a centerline of the target by an angle that exceeds a heading threshold, and a course correction that is required to align the aircraft with the centerline of the target, responsive thereto; and
adjusting the beam axis responsive to the course correction.

18. The method of claim 17, wherein the course correction is a lateral axis course correction, and further comprising:
determining a vertical axis course correction as a function of the cross-wind data, upon each occurrence of a deviation between the actual aircraft heading and the intended heading exceeding a vertical heading threshold.

19. The method of claim 18, further comprising:
at the processor,
receiving a current pitch and a current yaw;
referencing an intended pitch and intended yaw;
determining the course correction includes determining an occurrence of a deviation between the current pitch and the intended pitch exceeding a pitch threshold;
determining the course correction includes determining an occurrence of a deviation between the current yaw and the intended yaw exceeds a yaw threshold; and
generating control motor commands is in accordance with each respective course correction.

20. The method of claim 19, further comprising:
receiving landing lights status data reflective of an orientation and configuration of the landing light projection; and
confirming that the beam axis has been centered on the target.

* * * * *